June 5, 1923.
A. N. PIETROK
ANIMAL TRAP
Filed June 3, 1922
1,457,670
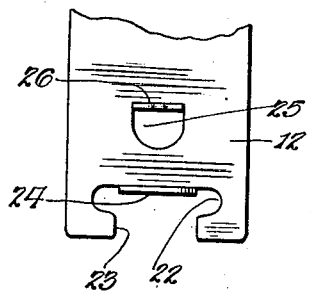
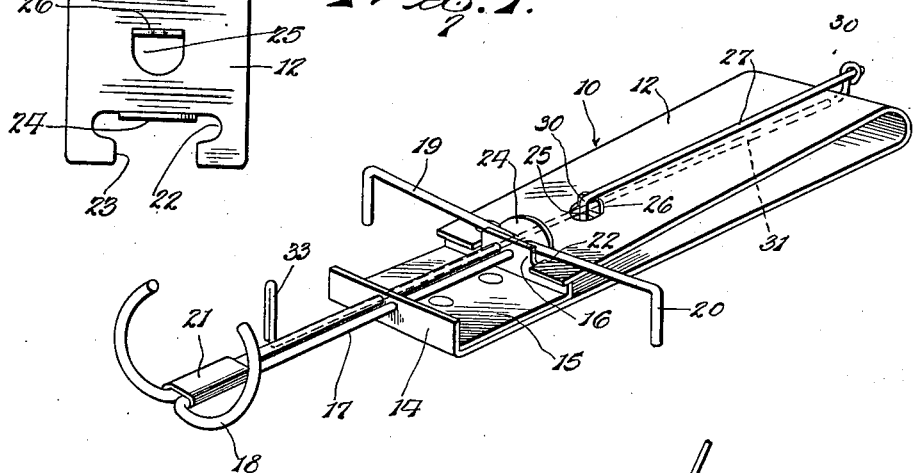
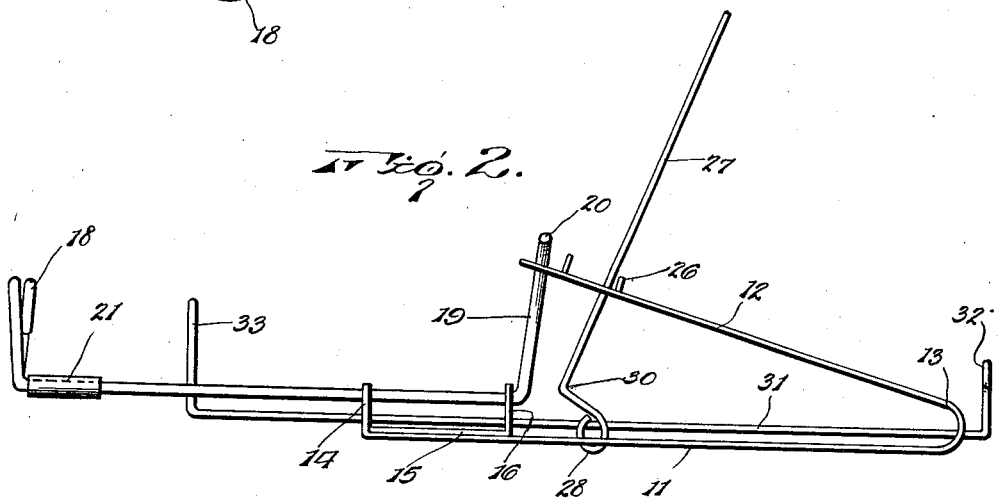
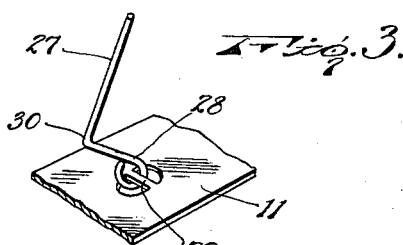
Inventor
A. N. Pietrok.
By Lacey & Lacey, Attorney Patented June 5, 1923.

1,457,670

UNITED STATES PATENT OFFICE.

ANDREW N. PIETROK, OF STAYTON, OREGON.

ANIMAL TRAP.

Application filed June 3, 1922. Serial No. 565,650.

*To all whom it may concern:*

Be it known that I, ANDREW N. PIETROK, a citizen of the United States, residing at Stayton, in the county of Marion and State of Oregon, have invented certain new and useful Improvements in Animal Traps, of which the following is a specification.

My invention relates to traps for catching small destructive animals, such as gophers and other rodents or burrowing animals, and the object of the invention is to provide a trap which is easily set and sure to trip and catch the rodents. The trap has fewer parts than other devices of the same character and is accordingly less liable to get out of order. It is especially well adapted for insertion in burrowed holes or passages made by the rodents and can, accordingly, catch with certainty any rodents coming out of their nests.

One embodiment of the invention is illustrated in the attached drawing, and

Figure 1 shows a perspective view of the trap set;

Fig. 2 is a side elevation of the trap sprung;

Fig. 3 is a fragmentary perspective view of a detail of the trap, and

Fig. 4 is a fragmentary top plan view of another detail.

The trap consists of a body 10 which is preferably made of spring steel or similar flexible material and the plate is bent in V-shape form as seen in Fig. 2, having a base leaf 11 and a top or operating leaf 12 joined together, as at 13. The base leaf is longer than the top leaf and terminates with an upwardly bent flange 14 behind which is secured by rivets, or in any other suitable manner, a bracket 15 also made of plate with a bent up ledge 16. The flange 14 and the bent up ledge 16 of the bracket 15 are spaced apart and provided with a pair of small openings each forming a bearing for the long shanks 17 of the jaws 18, which shanks extend in longitudinal direction of the trap and terminate at the rear end with a pair of arms 19 having short hooks 20 at their free ends. The jaws 18 are semi-circular in shape and bent towards each other, as seen in Fig. 1, with the jaws in open position when the arms 19 are substantially in alinement with each other transversely to the central plane of the trap. Close behind the jaws 18 is shown a sleeve 21 embracing the shanks 17 permitting rotation of the latter in the sleeve.

In the upper leaf 12 is provided a recess 22 in which the arms 19 are adapted to engage. This recess 22 opens forwardly at the end of the leaf 12 forming a pair of spaced fingers 23 which stand apart sufficiently to engage with the ledge 16 of the bracket 15. At the back of the recess 22 is a lip 24 bent upwards to form an abutment for the arms 19. Behind the recess 22 is a small aperture 25 which has a tongue 26 at its rear end projecting above the upper surface of the leaf 12. Through this aperture 25 a lever 27 projects and this lever is preferably made out of a piece of wire formed with a loop 28 at its lower end engaging with a strip 29 provided in the bottom leaf 11. A knee 30 is formed near the eyelet 28 adapted to engage with the tongue 26 when the lever 27 is swung rearwardly over the upper leaf 12, as seen in Fig. 1.

In order to retain the lever 27 in the bent down position, a rod or trigger 31 is mounted in suitable openings provided in the flange 14, the ledge 16 and the bend 13 to slide along the trap. This rod or trigger 31 has an eyelet 32 at its rearmost end adapted to engage over the free end of the lever 27 when in bent down position, as seen in Fig. 1. The other end of the sliding rod or trigger 31 has a finger 33 adapted to receive the bait.

When in released position, as seen in Fig. 2, the two arms 19 of the trap are approximately in vertical position while the bent jaws 18 intersect as seen in that figure. In order now to set the trap the lever 27 is first swung backwards while pressure is applied on top of the leaf 12 to compress the same and permit the engagement of the knee 30 with the tongue 26. At the same time the rod or trigger 31 is slid forwardly slightly until the eyelet 32 engages over the free end of the lever 27. With the parts in this position the jaws 18, which are still closed, may be inserted into the entrance of the dug out passage leading into the rodent's nest, when the trap is placed on the ground with the bait on the finger 33 of the sliding rod or trigger 31. The arms 19 are thereupon bent apart until their hooks 20 touch the ground or with the arms resting lightly upon the upper face of the leaf 12, when the jaws 18 will simultaneously be thrown apart, as seen in Fig. 1. If the jaws and the shanks have been inserted about level with the finger 33 into the entrance of the passage, it will be evident that the animal cannot pass out without touching the finger 33. The slightest push on the finger 33 will then cause the eyelet 32 to release the lever 27 and the lever 12 now being free will throw the arms 19 upwards and close the jaws 18 around the animal's body.

Having thus described the invention, what is claimed as new is:

1. An animal trap comprising a V-shaped flexible member having an upper and a lower leaf, a pair of jaws journaled in said lower leaf, said jaws including arms engaging with said upper leaf to be swung in the direction of closing the jaws, means for depressing said upper leaf, said means including a lever fulcrumed in the lower leaf and extending through an aperture provided in the upper leaf, a ledge at the end of said lower leaf, alined bearings being provided in said ledge and in the apex of said member, a trigger slidably mounted in said bearings, and a lever engaging element and a bait holding element on said rod.

2. An animal trap comprising a V-shaped flexible member having an upper and a lower leaf, a pair of jaws journaled in said lower leaf, said jaws including arms, an opening in said upper leaf for said arms, the edges of said opening adapted to engage with said arms to swing them in the direction of closing the jaws, means for depressing said upper leaf, said means including a lever fulcrumed in the lower leaf and extending through an aperture provided in the upper leaf, a ledge at the end of said lower leaf, alined bearings being provided in said ledge and in the apex of said member, a trigger slidably mounted in said bearings and a lever engaging element and a bait holding element on said trigger, said bearings being situated between said elements.

In testimony whereof I affix my signature.

ANDREW N. PIETROK. [L. S.]